United States Patent [19]

Saito et al.

[11] Patent Number: 4,962,465
[45] Date of Patent: Oct. 9, 1990

[54] CHARACTER PROCESSOR PROVIDED WITH DOT PATTERN CORRECTING FUNCTION

[75] Inventors: Keizo Saito, Kyoto; Masanobu Watanabe, Nara, both of Japan

[73] Assignee: Sharp Kabushiki Kaisha, Osaka, Japan

[21] Appl. No.: 291,230

[22] Filed: Dec. 28, 1988

[30] Foreign Application Priority Data

Dec. 28, 1987 [JP] Japan .................................. 62-335194

[51] Int. Cl.⁵ ........................ G09G 5/26; G06F 15/68
[52] U.S. Cl. .................................... 364/518; 340/735; 340/730; 340/790
[58] Field of Search ...................... 364/523, 518, 521; 340/730, 731, 735, 790

[56] References Cited

U.S. PATENT DOCUMENTS

| | | | |
|---|---|---|---|
| 4,408,198 | 10/1983 | Kudirka | 340/729 |
| 4,517,560 | 5/1985 | Murayama et al. | 340/790 |
| 4,555,191 | 11/1985 | Gojo | 400/121 |
| 4,712,102 | 12/1987 | Troupes et al. | 340/790 |
| 4,715,006 | 12/1987 | Nagata | 364/523 |
| 4,794,451 | 12/1988 | Suzuki et al. | 358/96 |

FOREIGN PATENT DOCUMENTS

62-219180 of 1987 Japan .

Primary Examiner—Gary V. Harkcom
Assistant Examiner—Raymond J. Bayerl

[57] ABSTRACT

A character processor for reading a source character from a character generator and outputting it to an output unit after editing. It is provided with a dot pattern correcting function, which includes generating a magnified thick character by magnifying the read souce character pattern. It further includes generating a magnified character contour outline by magnifying the read source character pattern in parallel with the magnified thick character generation, shifting the magnified blanked character in predetermined directions, synthesizing the magnified thick character and the shifted magnified blanked character, removing a domain surrounded by a contour of the magnified blanked character from the magnified thick character, thereby generating a magnified blanked character with a thick contour.

18 Claims, 9 Drawing Sheets 72 x 72 DOT MAGNIFIED BLANKED CHARACTER PATTERN

24 × 24 DOT SOURCE PATTERN

A1: SHIFTING 1 BIT RIGHT ACCOMPANIED BY LEAST SIGNIFICANT BIT OF B

FIG. 5(c)

A2: SHIFTING 1 BIT LEFT ACCOMPANIED BY MOST SIGNIFICANT BIT OF D

72 × 72 DOT MAGNIFIED BLANKED PATTERN

FIG. 11(a) SOURCE DOT PATTERN

ADDITIONAL BITS AT THE TIME OF 5 MAGNIFICATIONS

FIG. 13

72×72 DOT MAGNIFIED CHARACTER PATTERN

FIG. 14

72×72 DOT MAGNIFIED THICK CHARACTER PATTERN

72×72 DOT MAGNIFIED BLANKED CHARACTER PATTERN

CHARACTER PROCESSOR PROVIDED WITH DOT PATTERN CORRECTING FUNCTION

BACKGROUND OF THE INVENTION

1. Field of the Invention

The present invention relates to a character processor such as a word processor, office computer or the like. More particularly, it relates to a character processor provided with a dot pattern correcting function capable of correcting outline contours of thick characters, symbols, graphic information and others when they are magnified and sent to an output unit such as a display, printer or the like.

2. Description of the Prior Art

Generally for processing data in a word processor or office computer, data such as characters, symbols, graphic information or the like which is inputted through an input unit is subjected to editing. Then it is output to a printer as a dot pattern or output to a CRT display. Then, for printing or display, it is frequently magnified before being output so as to emphasize the characters, symbols, graphic information and others. A character contour outline as source which can be inputted in a word processor, can also be magnified as described. Normally, the character contour outline is magnified by one dot to delineate the character.

Such prior art character contour outline generation is disclosed in Japanese Patent Laid-Open No. 219180/1987 titled "Pattern Generator".

However, in dot pattern processing according to the aforementioned prior art, since the thickness of a line of a character contour outline is constant (1 dot) at all times regardless of magnification, the line of a magnified character contour outline is limited in its ability to be magnified, being either too narrow or too thin. Accordingly, for a character contour outline, the disadvantage inherent in the prior art is such that it is not possible to emphasize characters even by magnifying the character.

SUMMARY OF THE INVENTION

The invention relates to a character processor provided with a dot pattern correcting function, including:

character pattern storage device for storing data of various source character patterns formed by dots;

input device having an input key for inputting character data and an edit key for editing source character patterns through magnification or the like;

reading device for reading one source character pattern from the character pattern storage device upon receipt of a character data inputted from the input device;

temporary storage device for temporarily storing the source character pattern read out;

magnified thick character generation for fetching the source character pattern from the temporary storage device when a direction to increase magnification is received from the input device, adding dots according to the magnification on a predetermined side of the source character pattern, thereby generating a magnified thick character;

magnified character contour outline generation device for generating a magnified character contour outline pattern from getting an exclusive OR between a character pattern synthesized by fetching the source character pattern from the temporary storage device when a direction to increase magnification is received from the input device, magnifying it in the same magnification as the magnified character generation, shifting at least vertically and horizontally, and the source character pattern;

pattern shift device for shifting the magnified character contour outline pattern to the side on which dots are added at the time of magnified thick character generation in a predetermined number of dots;

synthesis device for synthesizing the magnified character contour outline pattern, removing a domain surrounded by an outline contours of the shifted magnified blanked character contour outline pattern from the magnified thick character pattern, thereby generating and outputting a magnified character contour outline with a thick contour; and output device for outputting the magnified blanked character contour outline output from the synthesis device.

The character pattern storage device may comprise a character generator, and the temporary storage device may comprise a buffer.

Figure 1:
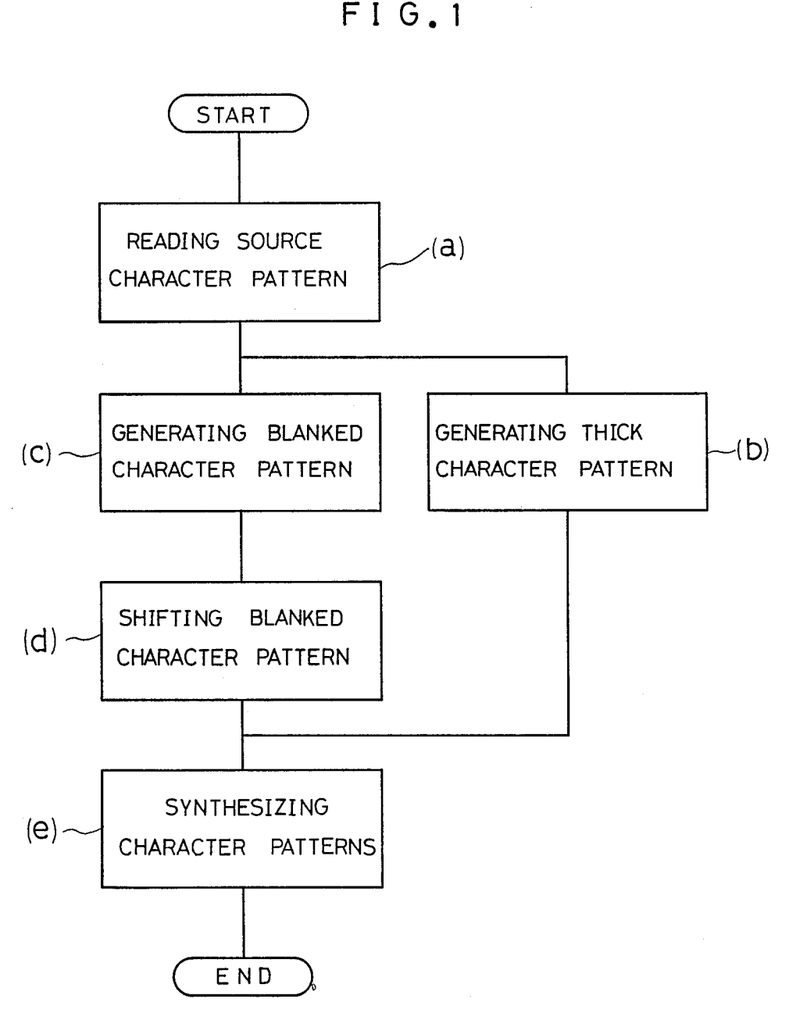
FIG. 1 is a flowchart representing a dot pattern correction given in one embodiment of the invention.

Then, as shown in flowchart of FIG. 1, in a character processor for reading data of source character patterns from the character pattern storage device for storing data of various character patterns formed by dots, editing through magnification or the like takes place. Then the characters output to an output unit. In another mode of the invention, the invention relates to a dot pattern correcting method. The method comprises the steps of:

(a) reading the source character patterns from the character pattern storage device;

(b) adding dots according to the magnification to the read source character patterns on a predetermined side of the source character patterns, thereby generating a magnified thick character;

(c) generating a magnified character contour outline pattern from getting an exclusive OR between a character pattern synthesized by magnifying the source character pattern read out from the character pattern storage device in parallel with the magnified thick character generation of the same magnification factor as the magnified thick character generation, then shifting it at least vertically and horizontally, and the source character pattern;

(d) shifting the magnified character contour outline pattern to the side to which dots were added at the time of magnified thick character generation by a predetermined number of dots, (e) synthesizing the magnified thick character pattern and the shifted magnified character contour outline pattern, removing a domain surrounded by a contour of the shifted magnified character contour outline pattern from the magnified thick character pattern;

thereby generating a magnified character contour outline with a thick contour is generated.

In the step (d), it is preferred that the magnified character contour outline pattern be shifted longitudinally by ½ of the number of dots added according to a longitudinal magnification factor and also transversely for ½ of the number of dots added according to a transverse magnification factor.

According to the character processor provided with a dot pattern correcting function of the invention, a magnified character is corrected by having outline contours of the character contour outline thickened according to the magnification factor. Therefore the disadvantage of the contour becoming too narrow or too

DETAILED DESCRIPTION OF THE PREFERRED EMBODIMENT

Figure 2:
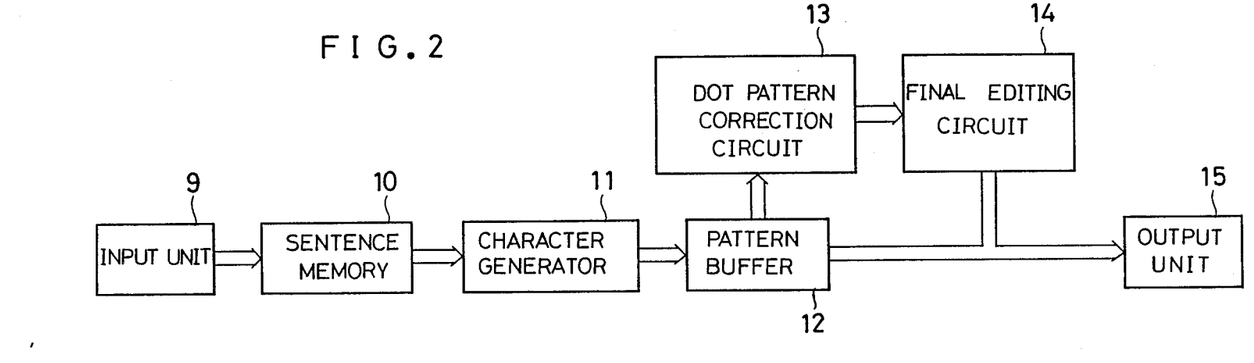
FIG. 2 is a block diagram representing a construction of a device used in the embodiment.

In FIG. 2 a reference numeral 9 denotes an input unit, which is provided with an input key for inputting character codes and an edit key for editing source character patterns through magnification and others. A reference numeral 10 denotes a sentence memory for storing codes indicating characters, symbols, graphic information and the like which are fed successively from the input unit 9. A reference numeral 11 denotes a character generator where source dot patterns corresponding to each character, symbol, graphic information element and others, have been stored. The generator converts a character code, for example, fed from the sentence memory 10, into a data comprising a dot pattern and outputs it to a pattern buffer 12. The pattern buffer 12 temporarily holds source dot pattern data fed from the character generator 11, and outputs the source dot pattern to an output unit 15, such as printer or the like, when magnification is not required. A reference numeral 13 denotes a dot pattern correction circuit, fetching data of the source dot pattern successively from the pattern buffer 12 with its predetermined correction, and then outputting as various character dot patterns. A reference numeral 14 denotes a final editing circuit, which processes a correction pattern fed from the dot pattern correction circuit 13 into the required dot pattern and outputs it to the output unit 15.

Figure 3:
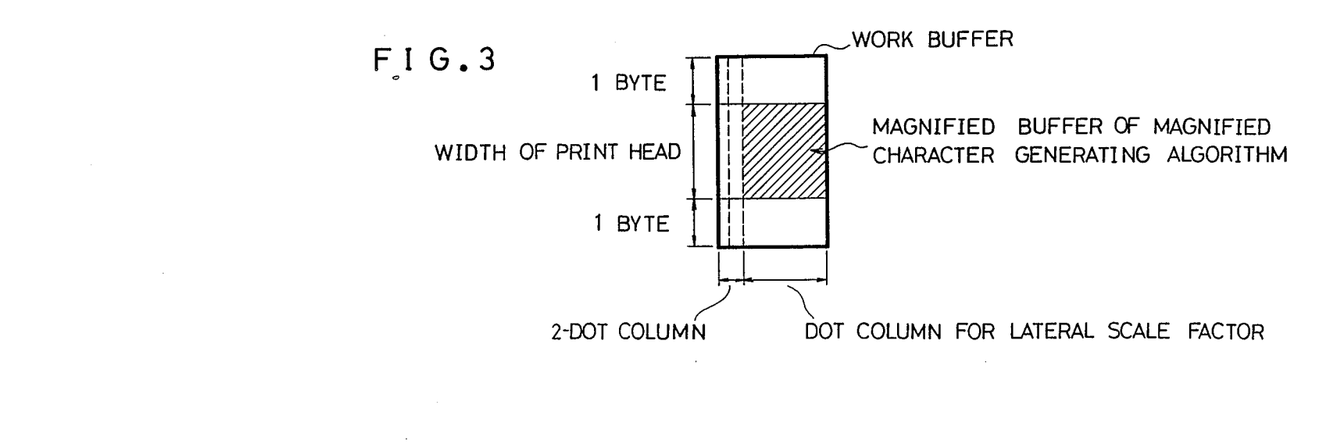
FIG. 3 is a typical drawing showing contents of a work buffer in the processing of the embodiment.
Figure 4:
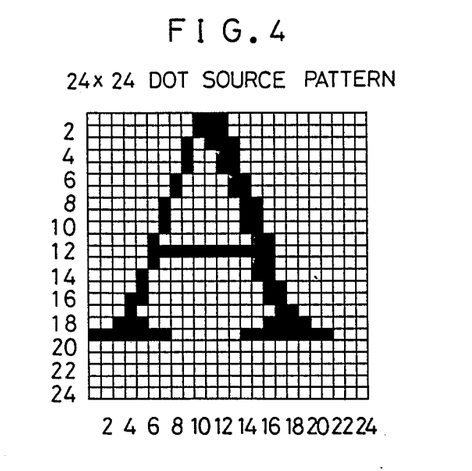
FIG. 4 is a source pattern of character "A" used for description of the embodiment.

Next, character contour generation, generation according to the dot pattern correcting method of the embodiment, will be described with reference to FIG. 13 to FIG. 16. Then, during the processing the work buffer shown in FIG. 3 will be required. Further, FIG. 4 represents a source pattern of the character "A" displayed as a dot matrix of 24×24 dots. The dot pattern correcting method, according to the embodiment, combines conventional character contour outline generation and conventional thick character generation, effecting further the pattern editing which is a feature of the embodiment, thereby generating a character contour outline.

Here, we describe the prior art processing for generating the character contour outline by leaving only outline contours of the magnified character. The character contour outline generation is attained by repeating each processing of "magnified character expansion" for expanding a necessary portion of the magnified character according to a magnified character generation algorithm, "blanking" for leaving only the outline contours, 'transmission to print buffer' for transmitting a generated character contour outline pattern to a print buffer, and "pattern shift") for shifting patterns within a work buffer. A character contour outline for one line is obtainable through repeating each process above. Therefore a specified character contour outline may be generated by changing the line and repeating for the longitudinal scale factor.

Next, each process step aforementioned will be described in detail.

(1) Blanking

Figure 5A:
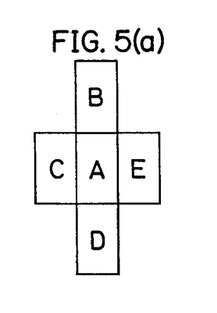
FIG. 5 to FIG. 9 are typical drawings for illustrating a magnified character contour outline generation of the embodiment.
Figure 5B:
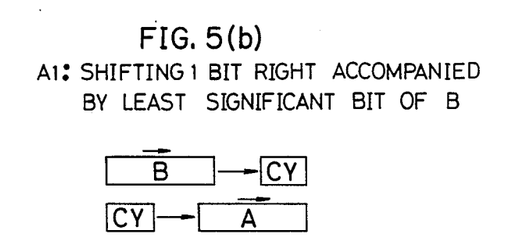
Figure 5C:
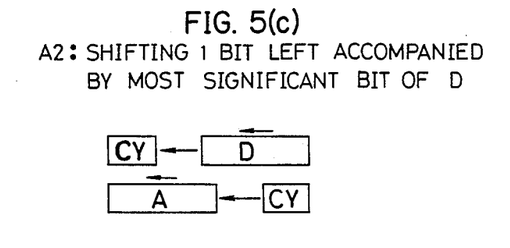

Blanking entails obtaining the contour point of a pattern through the following logical operation by byte unit, after expansion of the magnified character. Here, information shown in FIG. 5 is sent from the pattern buffer 12, and a generation of blanked pattern "X" of a byte "A" will be considered.

X=(A AND (NOT C)) OR (A AND (NOT E)) OR (A AND (NOT A1)) OR (A AND (NOT A2))

A1: shifting right by 1 bit accompanied by least significant bit of B

A2: shifting left by 1 bit accompanied by most significant bit of D

Thus, the contour point is obtained for "A" as referring to the vertical and horizontal, thereby generating "X". The byte for blanking is that corresponding to an oblique line portion in the work buffer shown in FIG. 6. As described above, a reference is necessary both vertically and horizontally in obtaining the contour. Therefore one dot column is provided, of one byte each vertically from the oblique line portion of the work buffer (that is, at the time of magnification this portion must be subjected to expansion). The generated contour pattern is loaded one column ahead. In the case of FIG. 5, the contour pattern "X" of "A" is loaded at a position of "C".

(2) Expansion of Magnified Character

Figures 6, 7:
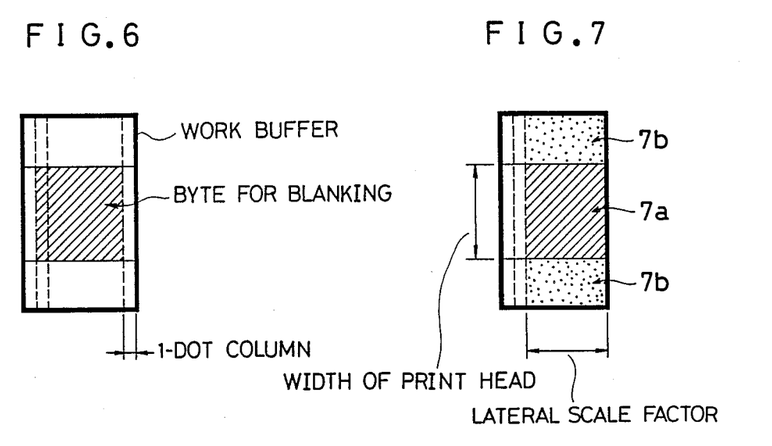

In FIG. 7, a part of the magnified character (print head width x lateral scale factor) is expanded on the oblique line portion of the work buffer according to the magnified character generation algorithm. In the case where merely the magnified character is generated, a portion of the oblique line 7a shown in FIG. 7 may be expanded, however, a portion necessary for blanking must be expanded on the portion 7b.

(3) Transmission to Output Buffer

Figure 8:
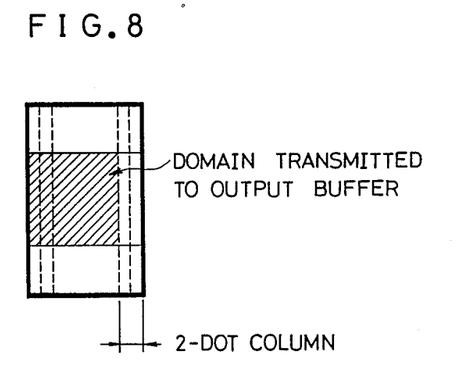

A character contour outline pattern generated through the aforementioned process is transmitted to the output buffer. As described, since the character contour outline pattern is generated successively one column ahead, a domain for transmitting to the output buffer is an oblique line portion of the work buffer shown in FIG. 8.

(4) Shift of Pattern

Figure 9A:
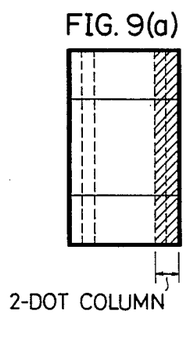
Figure 9B:
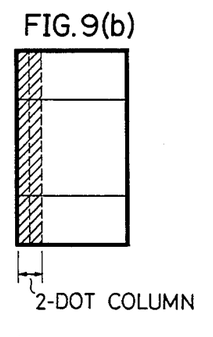

Whenever transmitted to the output buffer, the dot is shifted within the work buffer as shown in FIG. 9 (so as to prepare for the next column processing). The blanked character is generated by repeating the above-described process.

Figure 10:
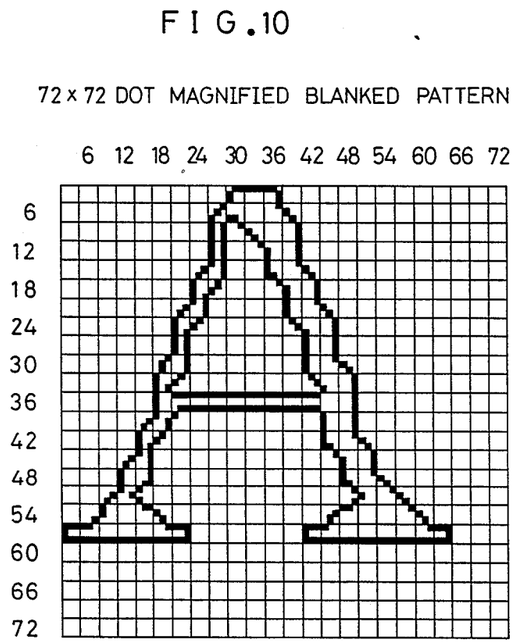
FIG. 10 is an explanatory drawing showing a pattern of the magnified character generated according to the embodiment.

FIG. 10 represents a magnified character contour outline generated through the above-described processing, by a factor of 3 magnification.

The prior art processing for generating a thick character will be described next.

Figures 11A, 11B:
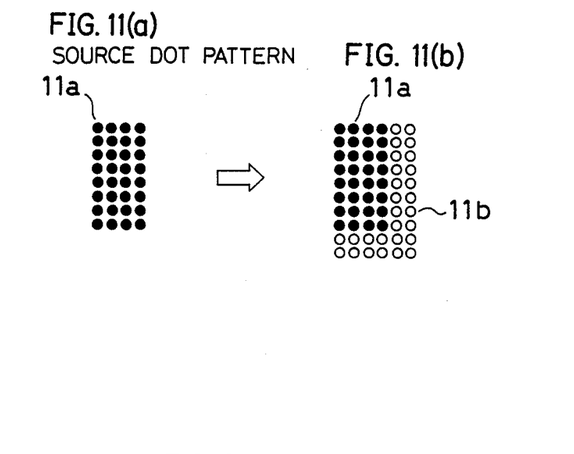
FIG. 11 and FIG. 12 are typical drawings for illustrating a magnified thick character generation according to the embodiment.
Figure 12:
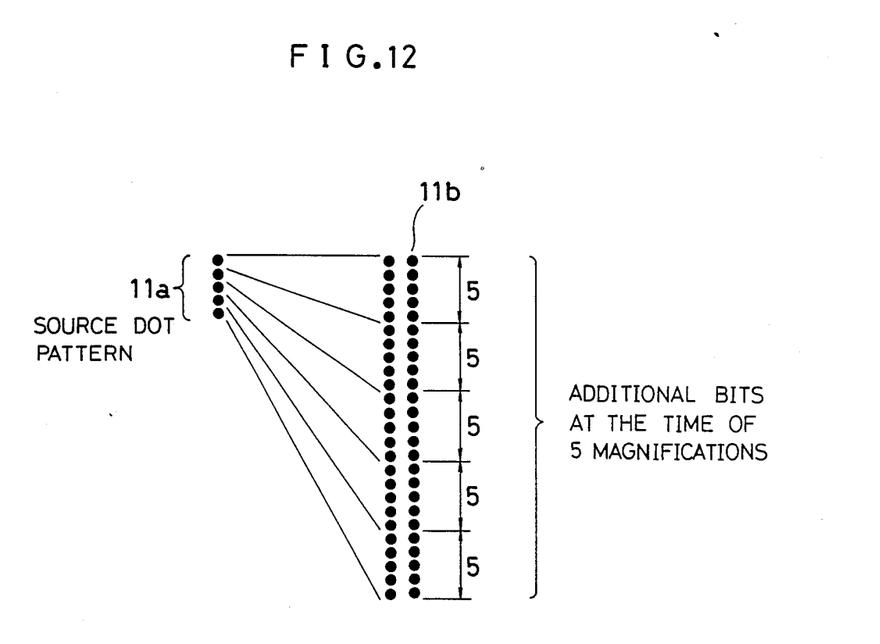

A thick character is magnified on the right side, lower right side and lower side of the black dot constituting a source dot pattern 11a as shown in FIG. 11, and a black dot 11b (indicated by the mark " " in the drawing) is added according to the magnification factor. FIG. 12 is an explanatory drawing showing the state of additional bits when the vertical magnification factor is 5 times, wherein black dots in two columns longitudinally per dot of the source dot pattern, or in 10 pieces, are added.

Figure 13:
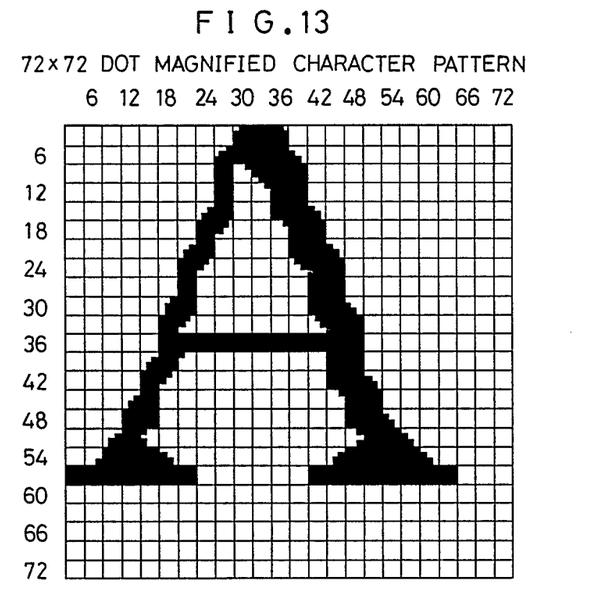
FIG. 13 is an explanatory drawing showing a pattern of the magnified character generated according to the embodiment.
Figure 14:
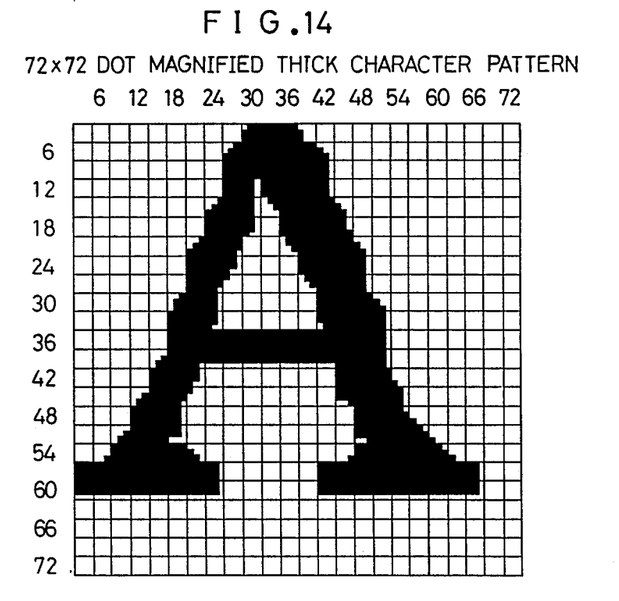
FIG. 14 is an explanatory drawing showing a pattern of the magnified thick character generated according to the embodiment.

FIG. 13 represents a magnified character generated through the above-described processing. FIG. 14 represents a magnified thick character obtained finally through the above-described process.

The embodiment of the invention comprises, as described above, combining the prior art character contour pattern generation and thick character generation, and further generating a character contour outline in the dot pattern correction circuit 13 and the final editing circuit 14 which are portions representing a feature of the embodiment. The pattern buffer 12 temporarily holds dot patterns fed successively from the character generator 11 for one line characters, for example, and outputs them directly to the output unit 15 such as printer, display or the like to print or display in normal case (where magnification is not carried out). However, in the case where the magnified character contour outline is displayed, the dot pattern correction circuit 13 is actuated to load an applicable dot information from the pattern buffer 12 therein. Then, the loaded dot information is subjected to the prior art character contour outline generation and thick character generation. A character contour outline is therefore generated in the final editing circuit 14.

Figure 15:
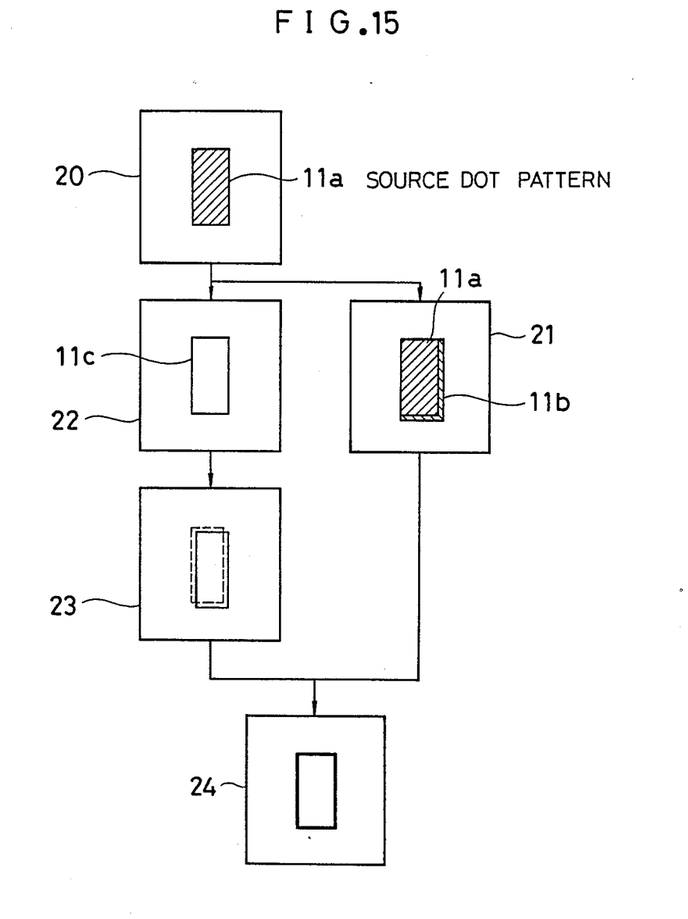
FIG. 15 is a block diagram for illustrating a processing of the embodiment.

FIG. 15 is a block diagram showing the operation of the embodiment. In the drawing, a block 20 indicates a state of the source dot pattern. Here, if generation of a character contour outline is indicated, a thick character generation shown in a block 21 is carried out by adding the dot 11b to the source dot pattern 11a. Thus, thick characters 11a, 11b are generated. Further, the source dot pattern 11a is subjected to blanking as shown in a block 22 in parallel with the processing of block 21, and a character contour outline 11c is also generated. Then, the character contour outline pattern obtained through blanking is shifted according to a pattern shift shown in a block 23. The shifting is realized by shifting by a predetermined number of dots to the same side as the side to which dots are added at the time of thick character generation (shifting from a position indicated by a dotted line to a position indicated by a full line in the block 23). That is, the shifting is made slantingly right and downwards for ½ the number of dots than those which are added at the time of thick character generation (longitudinally for ½ the number of dots added on a vertical scale factor, and transversely for ½ the number of dots added on a lateral scale factor).

Figure 16:
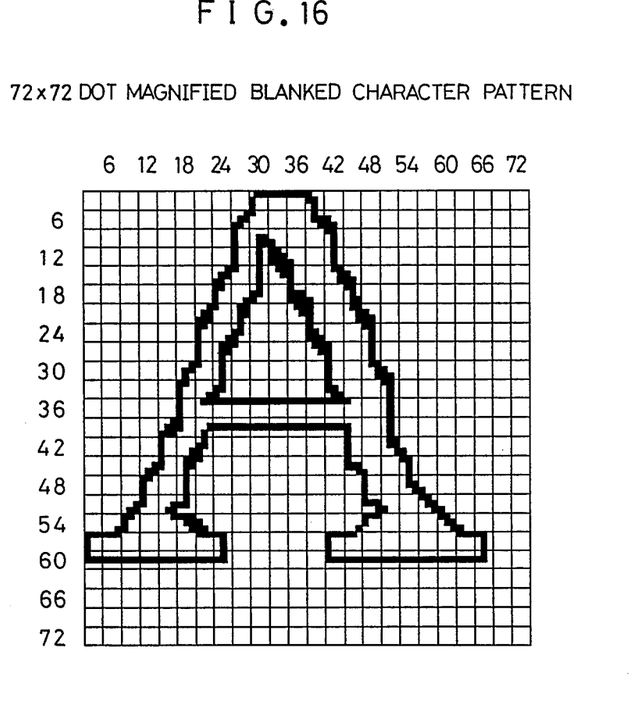
FIG. 16 is an explanatory drawing showing a pattern of the magnified character contour outline ultimately generated according to the embodiment.

Next, character patterns which are output from the thick character generation (block 21) and the pattern shifting (block 23) are synthesized by superposition shown in a block 24. Then, a magnified contour outline character shown in FIG. 16 is obtainable by removing the domain surrounded by a contour of the shifted magnified character contour outline pattern from the magnified thick character pattern.

Accordingly, from the dot pattern correcting method of the embodiment, a contour of the character contour outline can be thickened according to the magnification factor. Since a character contour will not be thinned by magnifying the character contour outline, an emphasis of characters which is the object of character magnification will not be lost.

In the aforementioned embodiment, the case where the character pattern of 24×24 dots for one character construction has been described. However, the character construction is not necessarily limited to 24×24 dots, and the embodiment can also be put into practice for other dot constructions.

Further, the direction in which a magnified character contour outline pattern is shifted is not limited to "slantingly right and downwards" as long as it is shifted in the same as the direction in which dots are added at the time of thick character generation.

What is claimed is:

1. A character processor provided with a dot pattern correcting function, comprising:

character pattern storage means for storing data of a plurality of source character patterns formed by a plurality of dots, each corresponding to one of a plurality of character data;

input means including an input key for inputting selected character data and an edit key for magnifying source character patterns;

read means, connected to said character pattern storage means, for reading a selected source character pattern from the character pattern storage means corresponding to selected character data inputted through the input means;

temporary storage means, connected to said read means, for temporarily storing said read source character pattern;

magnified thick character generation means, connected to said temporary storage means, for obtaining the source character pattern from the temporary storage means when an instruction for magnification is input through the edit key of the input means, and for adding a predetermined number of dots according to the input magnification, to predetermined sides of the source character pattern, thereby generating a magnified thick character;

magnified character generation means, connected to said temporary storage means, for generating a magnified character pattern contour outline from the source character pattern in said temporary storage means, and magnifying it to the input magnification, when said instruction for magnification is input from the input means;

pattern shift means, connected to said magnified character generation means, for shifting the magnified character pattern contour outline, in a plurality of directions corresponding to the sides to which dots were previously added by said magnified thick character generation means, a predetermined number of dots;

synthesis means, connecting said pattern shift means and said magnified thick character generation means, for synthesizing said magnified shifted character pattern contour outline and said magnified thick character, by removing a portion of said magnified thick character surrounded by said shifted magnified character pattern contour outline, to thereby generate a magnified character with a thick contour; and output means, connected to said synthesis means, for outputting said generated magnified character from said synthesis means.

2. The character processor according to claim 1, wherein said character pattern storage means comprises a character generator.

3. The character processor according to claim 1, wherein said temporary storage means comprises a buffer.

4. The character processor, as claimed in claim 1, wherein said pattern shift means shifts said magnified character pattern contour outline by ½ the number of dots previously added by said magnified thick character generation means, in each of said plurality of directions.

5. The character processor, as claimed in claim 1, wherein said magnified thick character generation means adds a predetermined number of dots to one predetermined side in a vertical direction and adds a predetermined number of dots to one predetermined side in a horizontal direction.

6. The character processor, as claimed in claim 5, wherein said pattern shift means shifts said magnified character pattern contour outline by ½ the number of dots previously added by said magnified thick character generation means, in each of said horizontal and vertical directions.

7. A dot pattern correcting method in a character processor for reading data of one of a plurality of source character patterns from a pattern storage device, which corresponds to a selected input character, in which said source character patterns are formed by dots and are magnified through a selected input magnification factor comprising the steps of:

(a) reading the said source character pattern corresponding to said selected input character from said character pattern storage mans;

(b) generating a magnified thick character pattern by adding a predetermined number of dots, according to said magnification factor selected, to the read source character pattern to predetermined sides of said source character pattern;

(c) generating a magnified character pattern contour outline from said source character pattern read out from the character pattern storage means, in parallel to the magnified thick character generation with the same magnification factor as the magnified thick character generation;

(d) shifting the magnified character pattern contour outline, in a plurality of directions which correspond to sides to which dots were previously added during said magnified thick character generation, a predetermined number of dots;

(e) synthesizing said magnified thick character pattern and said shifted magnified character pattern contour outline, by removing a portion of dots from said magnified thick character surrounded by said shifted magnified character pattern contour outline, to thereby generate a magnified character pattern with a thick contour.

8. The dot pattern correcting method according to claim 7, wherein step (d) comprises shifting the magnified character pattern contour outline longitudinally by ½ the number of dots added according to a vertical magnification factor and also transversely by ½ the number of dots added according to a lateral magnification factor.

9. A character processing system for producing an enhanced contour outline of an original pattern input into said system, said system comprising:

blank character pattern generating means for generating contour image data, in the form of a contour outline, from said input original pattern;

thick character pattern generating means for generating image data from said input original pattern, which has been thickened by a predetermined amount in a plurality of predetermined directions and thereby enhanced;

shifting means, connected to said blank character pattern generating means, for shifting said generated contour image data a predetermined amount in said plurality of predetermined directions, in proportion to said predetermined amount thickened by said thick character pattern generating means; and synthesizing means, connecting said shifting means and said thick character pattern generating means, for combining said shifted contour image data with said enhanced image data to thereby form an enhanced contour outline of said original pattern.

10. A system, as claimed in claim 9, further comprising:

character generator means, for a dot matrix character pattern, comprised of a plurality of dot source patterns, each containing a plurality of dots, corresponding to said input original pattern and inputting said generated dot matrix character to said blank character generating means and said thick character pattern generating means; and wherein said thick character pattern generation means thickens said dot matrix character pattern by adding a predetermined number of dots in a plurality of predetermined directions to each of said plurality of dot source patterns.

11. A system, as claimed in claim 10, wherein said shifting means shifts said generated contour image data by half the number of dots added by said thick character pattern generating means, in each of said plurality of directions.

12. A system, as claimed in claim 10, further comprising:

magnifying means, connected to said character generating means, for magnifying said generated dot matrix character by a predetermined magnification factor prior to said blank character pattern generating means and said thick character pattern generating means.

13. A system, as claimed in claim 9, further comprising:

magnifying means for magnifying said input original pattern by a predetermined magnification factor.

14. A method of producing an enhanced contour outline of an original pattern, comprising the steps of:

a. inputting said original pattern;

b. generating an image contour outline from said input original pattern;

c. generating image data from said input original pattern which has been thickened by a predetermined amount in a plurality of predetermined directions and thereby enhanced;

d. shifting said generated image contour outline a predetermined amount, in proportion to said predetermined amount thickened, in said plurality of predetermined directions; and e. combining said enhanced image data with said shifted contour image data to thereby form an enhanced contour outline of said original pattern.

15. A method, as claimed in claim 14, further comprising the step of:

g. converting said input original pattern into a corresponding dot matrix character pattern, comprised of a plurality of dot source patterns, each dot source pattern containing a plurality of dots, subsequent to step (a) and prior to steps (b) and (c).

16. A method, as claimed in claim 15, wherein said step (c) of generating enhanced image data thickens said dot matrix character pattern by adding a predetermined number of dots in a plurality of predetermined directions, to each of said plurality of dot source patterns.

17. A method, as claimed in claim 16, wherein said step (d) of shifting, shifts said generated image contour outline by half the number of dots added to step (c), in each of said plurality of directions.

18. A method, as claimed in claim 14, further comprising the steps of:

g. magnifying said input original pattern prior to steps (b) and (c).

* * * * *